United States Patent
Peel et al.

(10) Patent No.: US 11,882,362 B2
(45) Date of Patent: *Jan. 23, 2024

(54) CAMERA SYSTEM

(71) Applicant: TACTACAM, LLC, Caledonia, MN (US)

(72) Inventors: Jeff Peel, Decorah, IA (US); Benjamin Stern, Holmen, WI (US); Eduardo Lorenzo Gracia Elizondo, Cypress, TX (US)

(73) Assignee: TACTACAM LLC, Caledonia, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/699,858

(22) Filed: Mar. 21, 2022

(65) Prior Publication Data
US 2022/0210333 A1 Jun. 30, 2022

Related U.S. Application Data

(63) Continuation of application No. 16/366,760, filed on Mar. 27, 2019, now Pat. No. 11,284,007.

(60) Provisional application No. 62/648,763, filed on Mar. 27, 2018.

(51) Int. Cl.
*H04N 23/69* (2023.01)
*H04N 5/33* (2023.01)
*G03B 17/56* (2021.01)
*H04N 23/56* (2023.01)

(52) U.S. Cl.
CPC .............. *H04N 23/69* (2023.01); *G03B 17/56* (2013.01); *H04N 5/33* (2013.01); *H04N 23/56* (2023.01)

(58) Field of Classification Search
CPC .... H04N 5/23296; H04N 5/2256; H04N 5/33; G03B 17/56
See application file for complete search history.

(56) References Cited

U.S. PATENT DOCUMENTS

| | | | |
|---|---|---|---|
| 7,028,269 B1 | 4/2006 | Cohen-Solal et al. | |
| 8,072,581 B1 | 12/2011 | Breiholz | |
| 11,184,007 B2 * | 11/2021 | Tang | H03K 23/588 |
| 11,284,007 B2 * | 3/2022 | Peel | H04N 23/56 |
| 2006/0197840 A1 * | 9/2006 | Neal | G01S 3/7864 |
| | | | 348/169 |
| 2010/0277591 A1 | 11/2010 | Kowalsky | |
| 2011/0228098 A1 | 9/2011 | Lamb et al. | |
| 2011/0293255 A1 | 12/2011 | Kikuchi et al. | |

(Continued)

OTHER PUBLICATIONS

Lidar—Wikipedia, revision Mar. 24, 2017, retrieved from https://en.wikipedia.org/w/index.phptitle=Lidar&oldid=771949195 on Sep. 26, 2020 (Year: 2017).

*Primary Examiner* — Timothy J Henn
(74) *Attorney, Agent, or Firm* — McAndrews, Held & Malloy, Ltd.

(57) ABSTRACT

Systems, apparatuses, and methods are described which provide a camera system. A camera is in communication with a positioning device. The positioning device has a compass, gyroscope, and emits an infrared light beam. The camera has a sensor that receives reflected and/or scattered infrared light from a moving target. The camera changes its focus, zoom, and/or angle of a field of view of the camera based on information from its sensor, and gyroscope and compass information from the positioning device and/or camera.

18 Claims, 3 Drawing Sheets

(56) References Cited

U.S. PATENT DOCUMENTS

| | | |
|---|---|---|
| 2012/0126002 A1 | 5/2012 | Rudch |
| 2013/0012058 A1 | 1/2013 | Xiao et al. |
| 2013/0120586 A1 | 5/2013 | Takashima |
| 2013/0336628 A1 | 12/2013 | Lamb et al. |
| 2016/0127645 A1 | 5/2016 | Sudo |
| 2016/0248969 A1 | 8/2016 | Hurd |
| 2017/0085771 A1 | 3/2017 | Schwager et al. |
| 2019/0079370 A1 | 3/2019 | Peel et al. |
| 2019/0163038 A1 | 5/2019 | Peel et al. |
| 2019/0222759 A1 | 7/2019 | Feng et al. |

* cited by examiner

CAMERA SYSTEM

CROSS-REFERENCE TO RELATED APPLICATIONS

The present application is a continuation of U.S. application Ser. No. 16/366,760, filed Mar. 27, 2019, which claims benefit from and priority to U.S. Application No. 62/648,763, filed Mar. 27, 2018. The above-identified applications are hereby incorporated by reference herein in their entirety.

BACKGROUND

Conventional cameras provide a static view of an object. If the object of the picture moves, then the object can move out of the field of view or become out of focus. Moreover, a person is unable to keep his or her hands free when operating a conventional camera.

Further limitations and disadvantages of conventional and traditional approaches will become apparent to one of skill in the art, through comparison of such systems with the present disclosure as set forth in the remainder of the present application with reference to the drawings.

BRIEF SUMMARY

Systems, apparatuses, and methods provide a camera system substantially as illustrated by and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g." and "for example" set off lists of one or more non-limiting examples, instances, or illustrations.

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated.

Some embodiments according to the present disclosure provide systems, apparatuses, and methods relating to camera systems.

Figure 1:
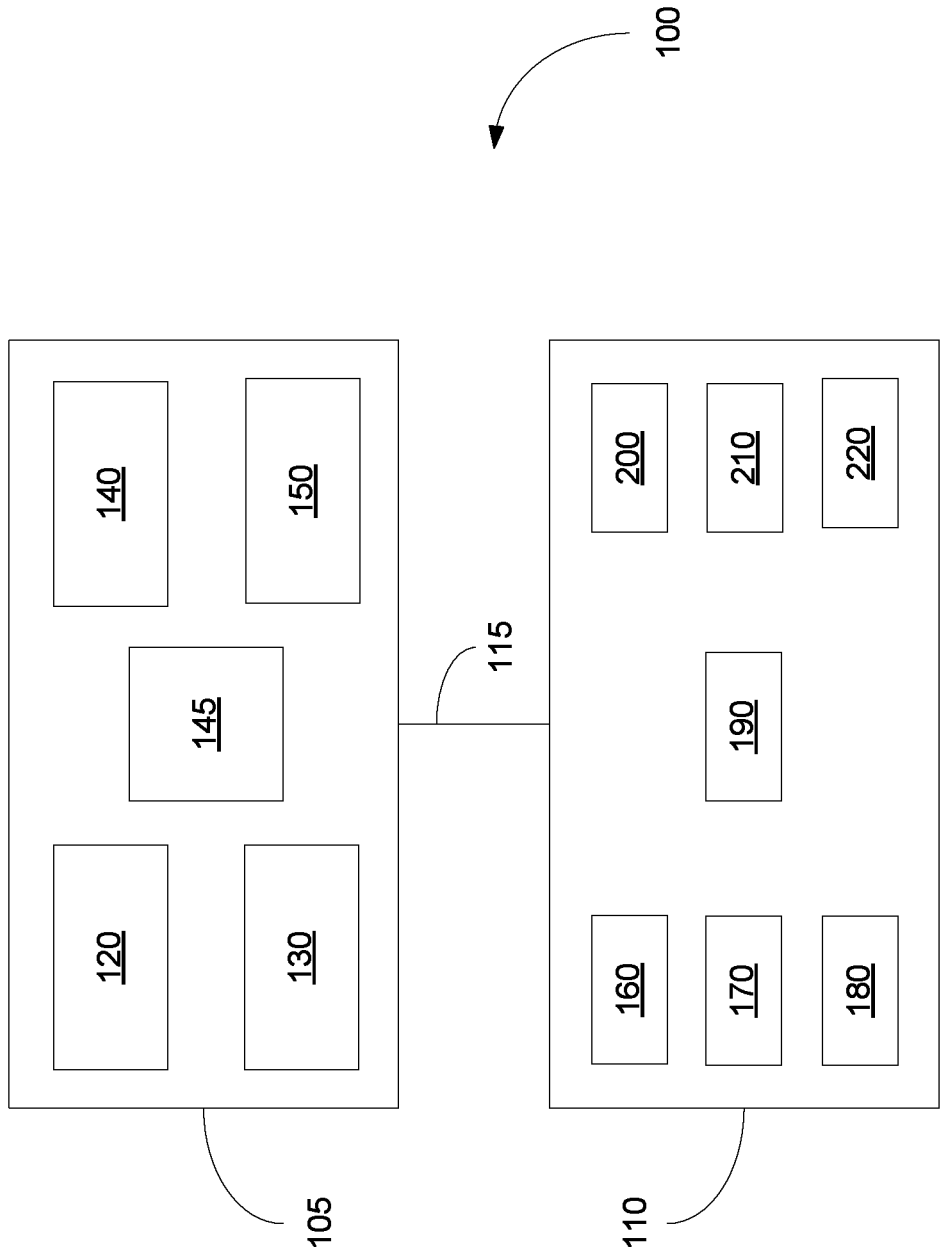
FIG. 1 shows an embodiment of a camera system according to the present disclosure.

FIG. 1 shows a block diagram of an embodiment of a camera system according to the present disclosure. Referring to FIG. 1, the camera system 100 includes a camera 105 and a positioning device 110. The camera 105 can be or include, for example, a recording device, a video recorder, an image recorder, a digital camera, a digital video recorder, etc. The camera 105 can configured to be supported by or rest on a camera mount (e.g., a tripod, platform, etc.). The camera 105 and the camera mount (not shown) can be operatively coupled via a wireless or wired link. The camera 105 and the positioning device 110 can be operatively coupled via a communication link 115. The communication link 115 can be wired (e.g., cable, wire, etc.) and/or wireless (e.g., cellular, WiFi, Bluetooth, radio frequency (RF), wireless local area network (WLAN), personal area network (PAN), IEEE 802.11, IEEE 802.16, Zigbee, satellite, infrared, optical, etc.). The communication link 115 can be one-way or two-way.

In some embodiments, the camera 105 can include, for example, a processor 120, a memory 130 (e.g., a non-transitory memory), a sensor 140 (e.g., an infrared sensor, an RF sensor, an electromagnetic sensor, etc.), a motor 145, and other input/output devices 150 (e.g., a display, a keyboard, a touch-sensitive screen, ports and/or transceivers for wireless and/or wired communication, transmitters, receivers, communication devices, buttons, user interfaces, graphical user interfaces, etc.). In some embodiments, the camera 105 can also include a compass and a gyroscope. These components or subsystems can be operatively coupled via, for example, one or more buses (not shown).

In some embodiments, the positioning device 110 can include, for example, a processor 160, a memory 170, a compass 180, a gyroscope 190 (e.g., a microelectromechanical system (MEMS) gyroscope), an infrared light emitter 200 (or other type of electromagnetic source such as a visible light emitter, a radio frequency emitter, a microwave emitter, etc.), a sensor 210 (e.g., an infrared sensor, an RF sensor, an electromagnetic sensor, etc.), and other input/output devices 220 (e.g., a display, a keyboard, a touch-sensitive screen, transceivers for wireless and/or wired communication, transmitters, receivers, communication devices, buttons, user interfaces, graphical user interfaces, etc.). These components or subsystems can be operatively coupled via, for example, one or more buses.

Figure 2:
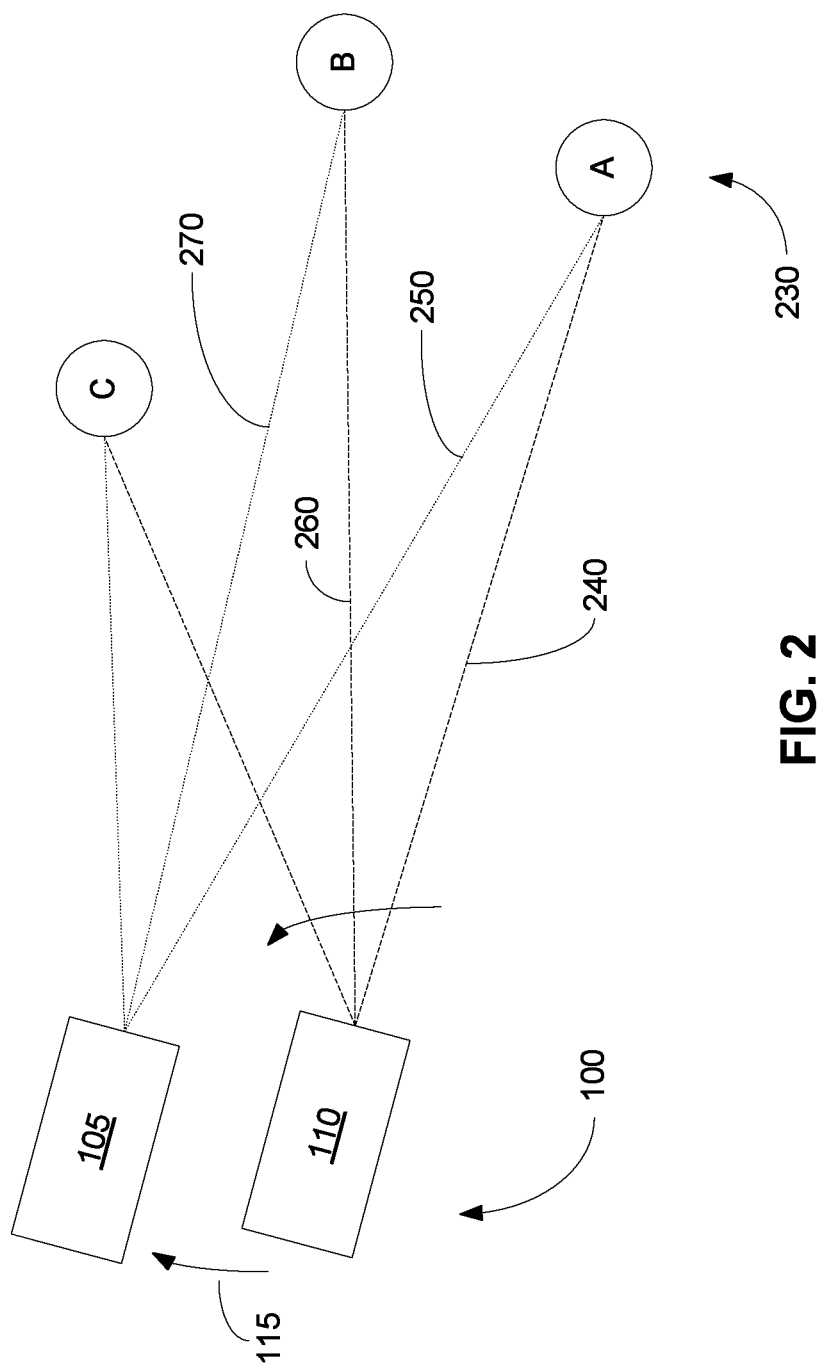
FIG. 2 shows the operation of the camera system according to an embodiment of the present disclosure.

FIG. 2 shows the camera system 100 in operation according to an embodiment of the present disclosure. Referring to FIG. 2, a target 230 (e.g., wildlife, object, person, vehicle, etc.) is moving (e.g., continuously or sporadically moving) from position A to position B and then from position B to position C.

Some embodiments provide that the positioning device 110 is pointed or aimed at the target 230 at position A and is caused (e.g., after actuating a trigger) to emit an infrared beam 240 (e.g., via the infrared light emitter 200). Some embodiments contemplate that the positioning device 110 has one or more lenses to focus the infrared beam 240. The infrared beam 240 is reflected or scattered off of the target 230 at position A, and the reflected or scattered infrared beam 250 is received by the sensor 140 of the camera 105. Some embodiments contemplate that one or more lenses may be used as part of the camera 105 to direct or guide infrared light to the sensor 140. The signal received by the processor 120 of the camera 105 from the sensor 140 based on the received reflected or scattered infrared beam provides the camera 105 with information as to the location (e.g., distance and/or direction) of the target 230, and/or the speed and/or movement direction of the target 230. Several signals or a sampling of one or more signals over a period of time from the sensor 140 might be used to determine the speed and/or movement direction of the target 230. Based on the received reflected or scattered infrared beam signals and the information determined based on the received reflected or scattered infrared beam signals, the processor 120 causes the camera 105 to automatically adjust one or more of a focus, a zoom, and an angle of the field of view.

In addition, some embodiments provide that the compass 180 and the gyroscope 190 of the positioning device 110 and/or the camera 105 provide information about where the positioning device 110 and/or the camera 105 is pointed or aimed at, thereby providing additional information about the position of the target 230, and/or the speed and/or movement direction of the target 230. The information from the compass 180 and the gyroscope 190 of the positioning device 110 can be sent to the camera 105 via the communication link 115 (e.g., wireless and/or wired link) and/or provided by a compass and gyroscope 190 of the camera 105. Based on the information received by the compass 180 and the gyroscope 180 from the positioning device 110 and/or generated by the camera 105, the processor 120 causes the camera 105 to automatically adjust one or more of a focus, a zoom, and an angle of the field of view.

Some embodiments provide that the compass- and gyroscope-based information received from the positioning device 110 and/or provided by camera 105 can be used by the processor 120 of the camera 105 to indicate (e.g., graphically) where to position the camera 105 so that the front of the camera 105, for example, will face the target 230.

Some embodiments provide that the compass- and gyroscope-based information can be used by the camera 105 to automatically adjust one or more of a focus, a zoom, and an angle of the field of view even if the target 230 is missed by the infrared beam emitted by the positioning device 110.

Some embodiments provide that the location of the target 230 in the field of view of the camera 105 can cause the processor 120 of the camera to change one or more of a focus, a zoom, and an angle of the field of view of the camera 105.

Some embodiments provide that the processor 120 of the camera 105 can compare the information received from the sensor 140 and the information received from the positioning device 110. Based on the comparison and possibly recent historical information stored in the camera 105, the processor 102 can select or weight information received from the sensor 140 and information received from the positioning device 110. Some embodiments provide that, based on the comparison, the camera 105 may automatically adjust or refine one or more of a focus, a zoom, and an angle of the field of view to more precisely or accurately track or follows the target 230 and keep the target 230 in the field of view of the camera.

Some embodiments provide that the processor 120 of the camera 105 can store, in memory 130, information received visually via its sensor 140 and digital compass-based and/or gyroscope-based information from the positioning device 110 from various target locations. The historical information (e.g., recent historical information) can be used to smooth out information being received, for example, from an unsteady hand wielding the positioning device 110. The historical information can also provide a basis from which other target locations can be relatively located.

When the target 230 reaches position B, the positioning device 110 is aimed or pointed at the target 230 at position B and caused to emit an infrared beam 260 at the target 230 at position B. Some embodiments provide that the positioning device 110 can be triggered to emit the infrared beam 260 at the target at position B. The infrared beam 260 is reflected or scattered off of the target 230 at position B, and the reflected or scattered infrared beam 270 is received by the sensor 140 of the camera 105. The signal received by the processor 120 from the sensor 140 based on the received reflected or scattered infrared beam provides the camera 105 with information as to the location (e.g., distance and/or direction) of the target 230, and/or the speed and/or movement direction of the target 230. Based on information determined based on the received reflected or scattered infrared beam signals, the processor 120 causes the camera 105 to automatically adjust or refine one or more of a focus, a zoom, and an angle of the field of view to more precisely or accurately track or follow the target 230 and keep the target 230 in the field of view of the camera.

For example, based on the information determined based on the received reflected or scattered infrared beam signals, the processor 120 may determine, for example, that, in moving from position A to position B, the target 230 has moved away from the camera 105 and further left in the field of view of the camera 105. The processor 120 may further determine, for example, that the target 230 is continuing to move left in field of view of the camera 105 at a particular speed and in a particular direction. Based on such exemplary determinations, the processor 120 may cause the camera 105 to adjust the angle of the field of view. The processor 120 may have to consider competing factors (e.g., weight different factors) such as the target 230 moving away which may favor making the angle of the field of view smaller versus the target 230 moving left in the field of view of the camera 105 which may favor making the angle of the field of view larger so that the target 230 does not move out of the field of view. In addition, the processor 120 may need to adjust and/or refine the autofocus and/or autozoom. For example, the processor 120 may need to consider the speed and direction of the target 230 in determining whether to change an angle of the field of view, an autofocus, and/or an autozoom.

Based on the information determined based on the received reflected or scattered infrared beam signals, the processor 120 may determine, for example, that, in moving from position B to position C, the target 230 has moved towards the camera 105 and further left in the field of view of the camera 105. The processor 120 may further determine, for example, that the target 230 is continuing to move left in field of view of the camera 105 at a particular speed and in a particular direction. Based on such exemplary determinations, the processor 120 may cause the camera 105 to adjust the angle of the field of view. The processor 120 might have to consider a plurality of factors (e.g., weight different factors) such as the target 230 moving closer which may favor making the angle of the field of view larger, and the target 230 moving left in the field of view of the camera 105 which may favor making the angle of the field of view larger so that the target 230 does not move out of the field of view. In addition, the processor 120 may need adjust and/or refine the autofocus and/or autozoom. For example, the processor 120 may need to consider the speed and direction of the target 230 in determining whether to change or refine an angle of the field of view, an autofocus, and/or an autozoom.

In addition, the processor 120 may need to take into account, any movement in the direction of camera 105. The camera 105 may provide a gyroscope and/or a compass to provide direction information about the direction that the camera 105 is facing. Thus, for example, if the camera 105 is rotating manually or automatically in a direction that keeps the target 230 centered in its field of view as the target 230 moves from position A to position B to position C, then the processor 120 may need to consider this factor (e.g., weight this factor) in determining whether to increase, decrease, or maintain the angle of view and/or to adjust and/or refine the autofocus and/or autozoom. Further, if the camera 105 is directed past a particle angle relative to vertical, then the processor 120 may need to flip the picture being recorded or viewed.

Some embodiments provide that the infrared beam is emitted continuously or periodically, for example, when a button is held down on the positioning device 110. Thus, with the button held down, the positioning device 110 can be fluidly aimed at the target 230 as it moves from position A to position B and from position B to position C, for example. The camera 105 with the sensor 140 can fluidly follow or track the target 230. Further, the camera 105 can fluidly adjust the angle of the field of view, an autofocus, and/or an autozoom as the target 230 moves from position A to position B and to position C.

Some embodiments provide that the positioning device 120 has its own sensor 210. Accordingly, the positioning device 120 can emit the infrared beam from its infrared light emitter 200, and can receive the reflected or scattered infrared beam via its sensor 210 along substantially the same beam path (e.g., back and forth along path 240 in FIG. 2). Thus, the positioning device 120 use this visual data from its sensor 210 to determine the location (e.g., distance and/or direction) of the target 230, and/or the speed and/or movement direction of the target 230. This information can be sent to the camera 105 via the communication link 115.

Figure 3:
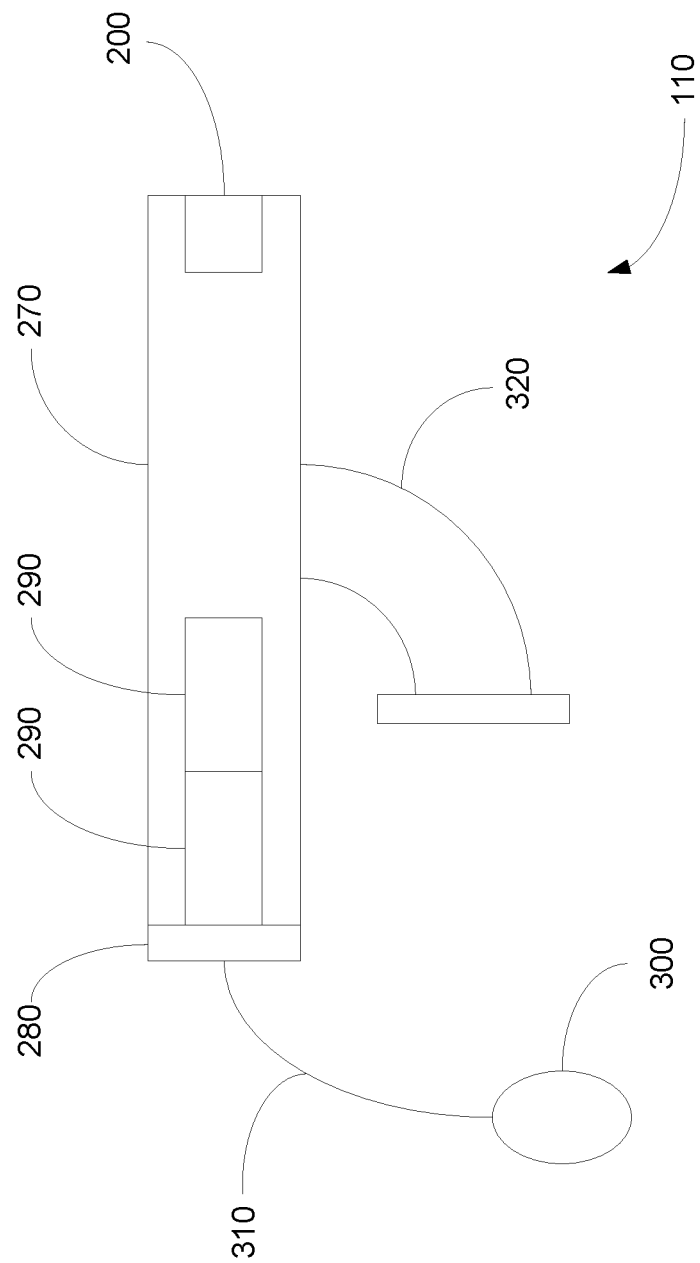
FIG. 3 shows a positioning device according to an embodiment of the present disclosure.

FIG. 3 shows an embodiment of the positioning device 110 according to the present disclosure. The positioning device 110 is shown with a housing 270 that houses the infrared light emitter 200. A cap 280 disposed at an end portion of the housing 270 closes a battery compartment that includes one or more batteries 290. The positioning device 110 is illustrated with a trigger 300 to activate the infrared light emitter 200 according to an embodiment of the present disclosure. The trigger 300 can have an adhesive backing so that it can stick to a surface. Although the trigger 300 is shown as connected to the rest of the positioning device 110 via a cord 310, some embodiments contemplate that the trigger 300 communicate with the rest of the positioning device 110 via a wireless communication link. The illustrated embodiment of the positioning device 110 also includes a mounting bracket 320 so that the positioning device 110 can be mounted on a weapon (e.g., a gun, a rifle, a bow, a crossbow, etc.), any object, a vehicle, a platform, etc. Different types of mounting brackets can be structured or designed for different applications.

Some embodiments provide that the camera 105 is disposed on a movable and/or rotatable camera mount. Some embodiments provide that the camera 105 and the camera mount are also electrically connected and in communication. The camera mount can be configured to rotate the camera 105 approximately 360 degrees in a horizontal plane and rotate approximately 330 degrees in a vertical plane. Some embodiments provide that the camera mount include a transparent housing that encloses and protects the camera from the elements without substantially affecting the ability of the camera to record images or the sensor 140 to sense infrared light. Some embodiments provide that one or more of the camera 105, the camera mount, and the positioning device 110 are equipped with a satellite-based positioning system (e.g., global positioning system (GPS)) to provide location information relating to the camera 105, the camera mount, and/or the positioning device 110. Based on the received reflected or scattered infrared beam signals, the processor 120 may cause a motor 145 in the camera 105 and/or in the camera mount to move the camera so that the front, for example, of the camera 105 faces (e.g., follows, tracks, etc.) the target 230. The processor 120 of the camera 105 can further use the facing direction of the camera 105 as well as the information determined based on the received reflected or scattered infrared beam signals to automatically adjust one or more of a focus, a zoom, and an angle of the field of view.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

The invention claimed is:

1. A system, comprising:
a camera that includes a processor and a sensor;
a positioning device comprising an electromagnetic source configured to emit a beam of electromagnetic radiation in an aim direction and adjust the aim direction of the beam such that the beam remains aimed at a target as the target moves from a first position to a second position;
wherein the positioning device is configured to send target position information to the camera;
wherein the sensor is configured to sense electromagnetic radiation of the beam reflected or scattered by the target as the target moves from the first position to the second position and provide the processor with information indicative of the sensed electromagnetic radiation; and
wherein the processor, based on a comparison of the information indicative of the sensed electromagnetic radiation and the target position information, causes the camera to track the target from the first position to the second position and adjust one or more of a focus, a zoom, and an angle of a field of view of the camera to account for movement of the target as the target moves from the first position to the second position.

2. The system according to claim 1, wherein:
the electromagnetic source comprises an infrared light emitter configured to emit an infrared beam in the aim direction that maintains the infrared beam aimed at the target; and
the sensor includes an infrared sensor configured to sense the infrared beam reflected or scattered by the target.

3. The system according to claim 1, wherein the positioning device is external to the camera.

4. The system according to claim 1, wherein the processor is configured to determine a speed of the target based on the information indicative of the sensed electromagnetic radiation and cause the camera to automatically adjust one or more of the focus, the zoom, and the angle of the field of view of the camera based on the determined speed of the target.

5. The system according to claim 1, wherein the positioning device is configured to be mounted on a weapon.

6. The system according to claim 1, wherein the positioning device is configured to be operated as a handheld device.

7. The system according to claim 1, wherein the positioning device is configured to be mounted on an object.

8. The system according to claim 1, wherein:
the positioning device comprises a gyroscope and a compass that generate information indicative of the aim direction of the electromagnetic source as the aim direction is adjusted to track movement of the target; and
the target position information comprises the information indicative of the aim direction.

9. The system according to claim 1, wherein the positioning device is configured to adjust the aim direction of the electromagnetic source independently of the camera.

10. The system according to claim 1, wherein the processor is configured to automatically adjust the angle of the field of view of the camera based on the information indicative of the sensed electromagnetic radiation.

11. A system, comprising:
a camera that includes a processor and a sensor; and
a positioning device configured to be aimed in an aim direction independently of the camera, adjust the aim direction such that the positioning device remains aimed at a target as the target moves from a first position to a second position, and provide the camera with information indicative of the aim direction as the positioning device tracks the target from the first position to the second position;
wherein the sensor is configured to sense electromagnetic radiation reflected or scattered by the target as the target moves from the first position to the second position and provide the processor with information indicative of the sensed electromagnetic radiation; and
wherein the processor is configured to automatically adjust, based on a comparison of the information indicative of the aim direction of the positioning device and the information indicative of the sensed electromagnetic radiation, one or more of a focus, a zoom, and an angle of a field of view of the camera as the target moves from the first position to the second position.

12. The system according to claim 11, wherein the positioning device comprises a gyroscope and a compass that generate the information indicative of the aim direction of the positioning device.

13. The system according to claim 11, wherein the positioning device includes an electromagnetic source configured to emit a beam of electromagnetic radiation in the aim direction of the positioning device.

14. The system according to claim 11, wherein the processor is configured to determine a movement direction of the target based on the information provided by the positioning device and cause the camera to automatically adjust one or more of the focus, the zoom, and the angle of the field of view of the camera based on the determined movement direction of the target.

15. The system according to claim 11, wherein the processor is configured to determine a speed of the target based on the information provided by the positioning device and cause the camera to automatically adjust one or more of the focus, the zoom, and the angle of the field of view of the camera based on the determined speed of the target.

16. The system according to claim 11, wherein the positioning device is configured to be mounted on a weapon.

17. The system according to claim 11, wherein the positioning device is configured to be operated as a handheld device.

18. The system according to claim 11, wherein the processor is configured to automatically adjust the angle of the field of view of the camera based on the information provided by the positioning device.

* * * * *